Jan. 30, 1945. A. G. EVANS 2,368,125
AGRICULTURAL IMPLEMENT
Original Filed March 22, 1943
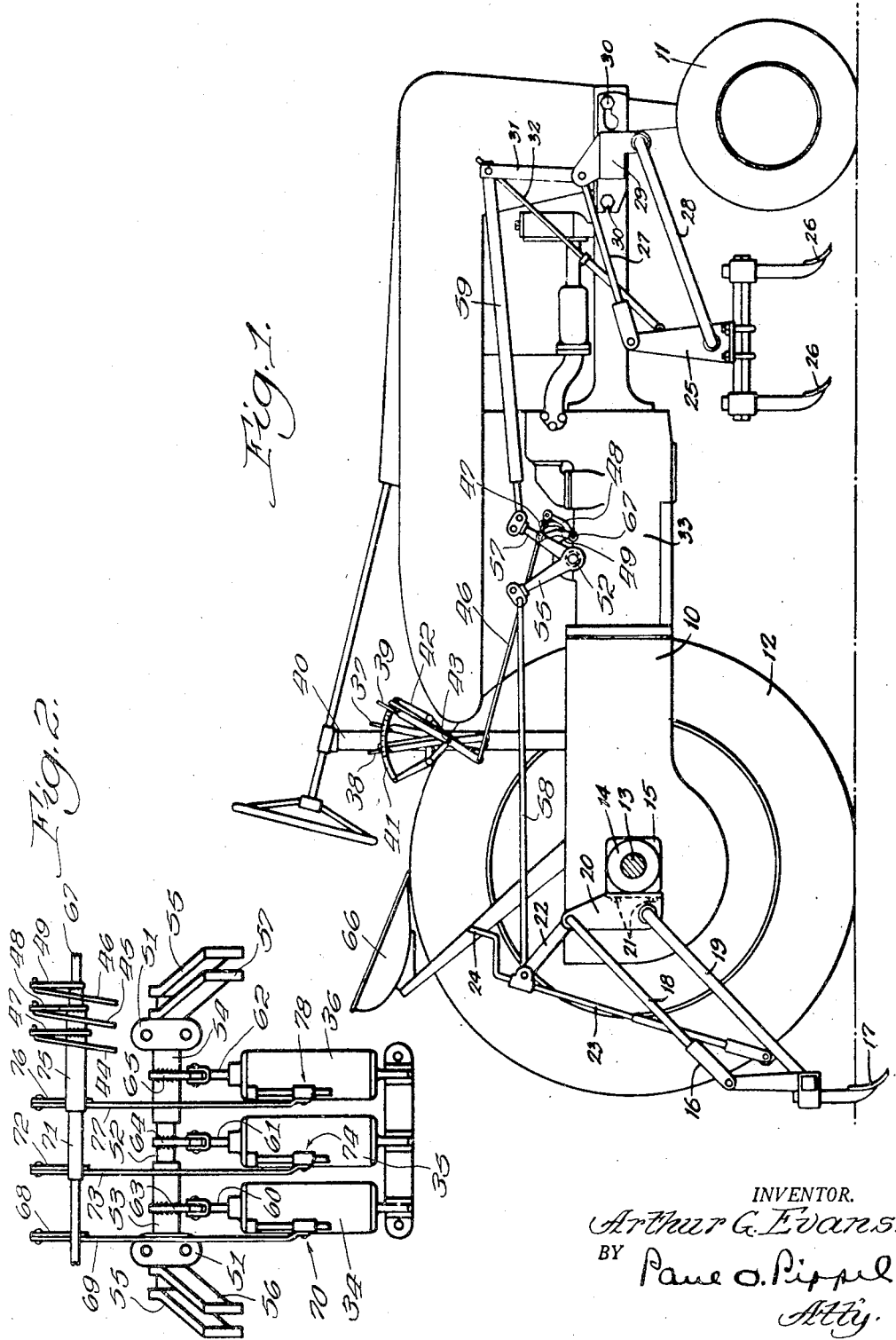
INVENTOR.
Arthur G. Evans.
BY Paul O. Pippel
Atty.

Patented Jan. 30, 1945

2,368,125

UNITED STATES PATENT OFFICE 2,368,125

AGRICULTURAL IMPLEMENT

Arthur G. Evans, Canton, Ill., assignor to International Harvester Company, a corporation of New Jersey Original application March 22, 1943, Serial No. 480,012. Divided and this application December 6, 1943, Serial No. 512,998

6 Claims. (Cl. 97—50)

This invention relates to tractor-mounted agricultural implements and, more particularly, to power lifting mechanism therefor.

The invention is particularly applicable to the type of power-lift control mechanism described in copending United States application of Carl W. Mott, Serial No. 466,463, filed Nov. 21, 1942, to which reference may be had for a full disclosure thereof; however, the invention may be readily adapted to other types of power lifts.

This application is a division of application Serial No. 480,012, filed March 22, 1943.

In tractor-mounted implements where there are working tools mounted for vertical movement on the front of the tractor and working tools mounted for vertical movement on the rear of the tractor, it is customary to place the principal cultivating equipment at the front of the tractor where it can be easily viewed by the operator, and where multi-row cultivating is practiced, the working tools frequently extend considerably away from the tractor, while the rear tools function principally to remove the rear tracks and do not extend laterally beyond the tractor. It is desirable when cultivating toward the end of a row, that the forwardly mounted tools be raised from the ground when they pass the end of the crop row, but that the rear tools remain in the ground until their part of the cultivating operation is completed. This type of independent operation of front and rear tools is generally known as "delayed lift." At other times, as when encountering raised land at the side of a field, it is desirable that front working tools on one side of the tractor be raised or lowered independently of the front working tools on the other side, either to adjust the working depth thereof or to raise the working tools out of contact with the ground. Since the rear working tools do not in the present instance extend laterally from the tractor, independent movement thereof is generally unnecessary. This type of independent operation of the front working tools on one side of a tractor with respect to those on the other side is known as "selective lift."

An object of the invention is to provide an improved apparatus for transmitting power to tractor-mounted implements from a source mounted on the tractor and deriving power therefrom.

Another object is to provide means connected to the source of power, whereby front and rear connected working tools may be raised or lowered independently.

Still another object is to provide means whereby front working tools on each side of the tractor may be independently operated, and rear working tools on both sides of the tractor operated as a unit.

These and other objects and advantages will become clear from the following detailed description when read in conjunction with the accompanying drawing, wherein:

Figure 1 is a view in side elevation of a tractor with an implement embodying the features of the present invention attached thereto, wherein provision is made for independent lifting of front and rear rigs or gangs of working tools; and Figure 2 is a fragmentary plan view of a detail, showing the power lifting mechanism by which front working tools on each side of the tractor may be operated independently, and rear working tools may be operated as a unit.

Referring particularly to Figure 1, it will be noted that the numeral 10 designates the body portion of a tractor having front wheels 11 and rear wheels 12. The rear wheels 12 are mounted on opposite ends of a transverse rear axle 13 journaled in a rear axle structure 14, having affixed thereto attaching portions 15 for the connection of rear cultivator rigs 16. It will be observed that the working tool is provided with a cultivator shovel 17 and is connected to the tractor through the intermediary of upper and lower parallel links 18 and 19, pivotally mounted upon a bracket 20 affixed to the attaching portion 15 by bolts 21. There is likewise provided on bracket 20 a pivoted lever 22 connected to the lower parallel link 19 by an adjustable rod 23 having a handle 24, whereby independent adjustment of the rear rig may be made. To the forward end of the tractor is connected for vertical movement a cultivator rig 25 having cultivating shovels 26 thereon. The connection of the working tool to the tractor is made by means of upper and lower parallel links 27 and 28 pivotally mounted upon a bracket 29 attached to the forward portion of the tractor by means of bolts 30. Also pivoted on the bracket is a lever 31 connected to the working tool by a lift rod 32. While the working tools on only one side of the tractor are shown, it may be noted that both sides of the tractor are similarly equipped. Likewise, it will then be noted that the front tools are shown in raised or transport position, while the rear tools are shown in working position.

The body portion 10 of the tractor is provided with an intermediate housing 33, in which is enclosed the fluid power arrangement by which the working tools are moved to and from ground working position. For the purposes of the present invention, only fluid-actuated cylinder devices 34, 35, and 36, indicated in Figure 2, are shown. Actuation of the cylinder devices, and therefore movement of the working tools, is under the control of the tractor operator and is initiated by manipulation of manual levers 37, 38, and 39 for cylinders 36, 35, and 34, respectively. The levers 37, 38, and 39 are mounted on the steering post 40 of the tractor for movement over a suitable quadrant 41, on the supporting framework 42, of which the levers are mounted by a pin 43. Through the intermediary of links 44, 45, and 46, the levers 37, 38, and 39 are connected respectively to levers 47, 48, and 49 mounted for rocking movement in a manner to be hereinafter more fully described.

Journaled in bearings 51 in housing 33 and extending to opposite sides of the tractor body is a transverse rock-shaft 52 surrounded by spaced loose sleeves 53 and 54 of such length as to permit the ends of shaft 52 to project somewhat therebeyond. At opposite ends of shaft 52 and outside the housing 33, levers 55 are mounted and affixed to shaft 52 as by welding. These levers are adapted for rocking movement with shaft 52 in directions longitudinally of the tractor. Adjacent opposite ends of sleeve portions 53 and 54 and outside the housing 33, levers 56 and 57 are mounted and affixed to the respective sleeve portions as by welding. These levers are likewise adapted for rocking movement with sleeve portions 53 and 54 in directions longitudinally of the tractor. In the arrangement shown in Figure 1, and it should be understood that both sides of the tractor are similarly equipped, the rear working tools on opposite sides of the tractor are connected by connecting rods 58 to the levers 55 on the shaft 52, while the forward working tools are connected by connecting rods 59 to levers 56 and 57 on opposite sides of the tractor. Forward movement of levers 55 effects upward movement of rear working tools 16, while forward movement of levers 56 and 57 effects upward movement of forward working tools 25. Since shaft 52 and sleeves 53 and 54 may be independently rocked, it becomes clear that with the arrangement shown, the rear working tools 16 may be raised or lowered as a unit independently of the forward working tools 25, and that the forward working tools 25 on each side of the tractor may be raised or lowered independently of each other.

Independent rocking movement of shaft 52 and sleeves 53 and 54 is effected by the cylinder devices 34, 35, and 36 located within the housing 33. These cylinder devices are of the double-acting fluid-actuated type and are provided with pistons 60, 61, and 62, as indicated in Figure 2. Pistons 60 and 62 are pivotally connected to rock arms 63 and 65 affixed respectively to sleeves 53 and 54 as by welding. When pistons 60 and 62 are extended, levers 56 and 57 are rocked forwardly, raising the forwardly mounted working tools from the ground. Upon retraction of pistons 60 and 62, the working tools are returned to ground-working position. Piston 61 of cylinder 35 is operatively connected to shaft 52 by rock arm 64 weldingly secured to the shaft. Upon extension of piston 61, shaft 52 is rocked, levers 55, on opposite ends of the shaft and on opposite sides of the tractor, move forward to simultaneously raise the rear working tools 16 on opposite sides of the tractor. Upon retraction of piston 61 these tools are lowered.

As stated before, fluid is supplied to the cylinder devices 34, 35, and 36 for actuating shaft 52 and sleeves 53 and 54 by a mechanism which forms no part of the present invention. This mechanism provides a high degree of control of the rate at which fluid is supplied to the cylinders 34, 35, and 36, and manual operation of this mechanism is effected by the levers 37, 38, and 39, accessible to and under the control of an operator from his station 66. Lever 39, through link 46, is connected to lever 49. Lever 49 is affixed to the end of a shaft 67 extending through and rotatably mounted in housing 33. Depending from shaft 67 is an arm 68 operatively connected by a link 69 to a control mechanism generally indicated at 70 for cylinder device 34. This control mechanism may be more fully understood by reference to copending United States application Serial No. 466,463. Shaft 67 is surrounded by a sleeve 71 somewhat shorter than shaft 67 and having affixed thereto the lever 48, which is connected by link 45 to hand lever 38. Likewise, affixed to sleeve 71 is an arm 72 operatively connected by a link 73 to a control mechanism generally indicated at 74 for cylinder device 35, the operation of which is substantially similar to that provided for control mechanism 70. Sleeve 71, adjacent its right-hand end, is surrounded by a sleeve 75 somewhat shorter than sleeve 71 and having affixed thereto the lever 47, which is connected by link 44 to hand lever 37. Also affixed to sleeve 75 is an arm 76 operatively connected by a link 77 to a control mechanism generally indicated at 78 for cylinder device 36.

When it is desired to effect delayed lifting of rear working tools with respect to front working tools, as at the end of a row, the manual levers 37 and 39 are first moved along the quadrant 41 to the position corresponding to the vertical position the front working tools are to occupy with respect to the ground. Cylinders 34 and 36 are then actuated and pistons 60 and 62 extended to rock levers 56 and 57 forwardly to raise the front working tools from ground-working position. With the organization shown in Figure 1, this is accomplished easily by an operator grasping the levers 37 and 39 with the fingers of one hand. When the rear working tools have reached the end of the row, the manual lever 38 is manipulated to turn sleeve 71 and actuate cylinder 35. Piston 61 is then extended to rock levers 55 forwardly, thus raising the rear working tools. Independent operation of front mounted tools on opposite sides of the tractor for selective lift thereof is effected by the independent manipulation of hand levers 37 and 39. However, it is readily apparent that the front tools may be operated simultaneously by joint manipulation of hand levers 37 and 39. Likewise, the operator can raise or lower all the working tools simultaneously by grasping all three of the levers with one hand and manipulating them jointly.

It should now be understood that a simple and efficient mechanism has been provided whereby selective lifting of the working tools at only one end of the tractor may be obtained, while the working tools at the other end of the tractor may be lifted as a unit. While the invention has been described in connection with the ultilization of cultivating tools, it is obvious, of course, that it is adaptable for use with other soil-working tools.

Having now described the invention in its preferred form, it should be understood that variations may be made therein without departing from the spirit of the invention or the scope of the appended claims.

What is claimed is:

1. In a tractor-mounted agricultural implement including earth-working tools mounted at different locations on the tractor for movement with respect thereto and power-lifting devices mounted on the tractor, in combination, a transverse shaft on the tractor, arms affixed to each end of said shaft, means connecting said arms to the tools in certain locations on the tractor, a pair of sleeves loose upon said shaft, arms affixed to each said sleeve, means connecting the arms on each sleeve to the tools in certain other locations on the tractor, separate power-lifting devices connected to each sleeve for independent rocking movement thereof, and another power-lifting device connected to said shaft for independent rocking movement thereof.

2. In a tractor-mounted agricultural implement comprising front and rear earth-working rigs mounted upon opposite sides of the tractor for vertical movement with respect thereto and power-lifting devices mounted on the tractor, in combination, a transverse shaft extending to opposite sides of the tractor, rock arms affixed to opposite ends of said shaft, means connecting said arms and one tool rig on each side of the tractor, a sleeve adjacent each end of said shaft and loosely mounted thereon, a rock arm affixed to each sleeve, means connecting each said arm to another tool rig on each side of the tractor, separate power-lifting devices connected to each sleeve for independent movement thereof, and another power-lifting device connected to said shaft for independent rocking movement thereof.

3. In a tractor-mounted agricultural implement comprising front and rear earth-working rigs mounted upon opposite sides of the tractor for vertical movement with respect thereto and power-lifting devices mounted on the tractor, in combination, a transverse shaft extending to opposite sides of the tractor, rock arms affixed to opposite ends of said shaft, means connecting each said rock arm to one of the rear rigs on each side of the tractor, a sleeve adjacent each end of said shaft and loosely mounted thereon, a rock arm affixed to each sleeve, means connecting each said rock arm to one of the front rigs on each side of the tractor, separate power-lifting devices connected to each sleeve for independent rocking movement thereof, whereby front rigs on each side of the tractor may be operated independently, and another power-lifting device connected to said shaft for independent rocking movement thereof, whereby rear rigs on each side of the tractor may be operated as a unit, independently of the front rigs.

4. In a tractor-mounted agricultural implement comprising front and rear earth-working rigs mounted upon opposite sides of the tractor for vertical movement with respect thereto and power-lifting devices mounted on the tractor and deriving power therefrom, in combination, a transverse rock-shaft mounted upon the tractor between said front and rear rigs and having ends projecting laterally from opposite sides of the tractor, a rock arm affixed to each end of said shaft, means connecting each said arm to the rear rig on its side of the tractor, a pair of laterally spaced sleeves on said shaft and having ends projecting laterally from opposite sides of the tractor, a rock arm affixed to the laterally projecting end of each said sleeve, means connecting each said arm to the front rig on its side of the tractor, and three power lift devices arranged within the lateral confines of the tractor for independently rocking said sleeves and said shaft.

5. In a tractor-mounted agricultural implement comprising front and rear earth-working rigs mounted upon opposite sides of the tractor for vertical movement with respect thereto and power-lifting devices mounted on the tractor and deriving power therefrom, in combination, a transverse rock-shaft mounted upon the tractor between said front and rear rigs and having ends projecting laterally from opposite sides of the tractor, a rock arm affixed to each end of said shaft, means connecting each said arm to the rear rig on its side of the tractor, a pair of laterally spaced sleeves on said shaft and having ends projecting laterally from opposite sides of the tractor, a rock arm affixed to the laterally projecting end of each said sleeve, means connecting each said arm to the front rig on its side of the tractor, three power lift cylinders arranged in side-by-side relation within the lateral confines of the tractor, a lever on each said sleeve and said shaft, and means connecting said cylinders to said levers for independently rocking said sleeves and said shaft.

6. In a tractor-mounted agricultural implement comprising front and rear earth-working rigs mounted upon opposite sides of the tractor for vertical movement with respect thereto and power-lifting devices mounted on the tractor and deriving power therefrom, in combination, a transverse rock-shaft mounted upon the tractor between said front and rear rigs and having ends projecting laterally from opposite sides of the tractor, a rock arm affixed to each end of said shaft, means connecting each said arm to the rear rig on its side of the tractor, a pair of laterally spaced sleeves on said shaft and having ends projecting laterally from opposite sides of the tractor, a rock arm affixed to the laterally projecting end of each said sleeve, means connecting each said arm to the front rig on its side of the tractor, three power lift devices arranged within the lateral confines of the tractor for independently rocking said sleeves and said shaft, and means for independently actuating said power lift devices including control means on each said device, a second transverse shaft parallel to said first-mentioned shaft, a first sleeve on said shaft, a second sleeve on said first sleeve, connecting means between each said shaft and said sleeves and one of said control means, and means for selectively, independently or simultaneously actuating said second shaft and its sleeves.

ARTHUR G. EVANS.